(12) United States Patent
Rosenthal et al.

(10) Patent No.: US 6,750,882 B1
(45) Date of Patent: Jun. 15, 2004

(54) AUTOMATED ASSOCIATION OF OPERATIONS WITH OBJECTS IN A GRAPHICAL WINDOW

(75) Inventors: Mark Barry Rosenthal, Arlington, MA (US); Michael L Turok, Peabody, MA (US); Daniel Jay Abramovich, Arlington, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 531 days.

(21) Appl. No.: 09/702,410

(22) Filed: Oct. 31, 2000

(51) Int. Cl.[7] .................................................. G09G 5/00
(52) U.S. Cl. ...................... 345/736; 345/734; 345/735; 345/764; 345/765; 345/853
(58) Field of Search ................................. 345/172, 734, 345/735, 736, 762, 763, 764, 765, 835, 840, 853, 866, 771, 704, 964, 965, 969; 700/83

(56) References Cited

U.S. PATENT DOCUMENTS

| | | | | |
|---|---|---|---|---|
| 5,509,116 A | * | 4/1996 | Hiraga et al. .................... 707/1 |
| 5,737,727 A | * | 4/1998 | Lehmann et al. ............... 705/7 |
| 6,448,981 B1 | * | 9/2002 | Kaczmarski ................. 345/763 |
| 6,522,934 B1 | * | 2/2003 | Irwin et al. .................... 700/11 |
| 6,523,027 B1 | * | 2/2003 | Underwood .................... 707/4 |
| 6,578,077 B1 | * | 6/2003 | Rakoshitz et al. .......... 709/224 |

* cited by examiner

*Primary Examiner*—Raymond J. Bayerl
*Assistant Examiner*—Cuong T. Thai
(74) *Attorney, Agent, or Firm*—Leonard C. Suchyta, Esq.; Joel Wall, Esq.

(57) ABSTRACT

Operations relating to objects in a window [301] are automatically included in the window based on the capabilities of the window and based on the resources required to implement the operations. The operations are stored in an operations repository [303]. An operations manager component [302] interfaces the windows [301] and the operations repository [303]. The operations may be operations related to elements of a telecommunications network and may be made available to the end-user by automatically adding buttons to menus in the window that invoke the operations.

36 Claims, 7 Drawing Sheets

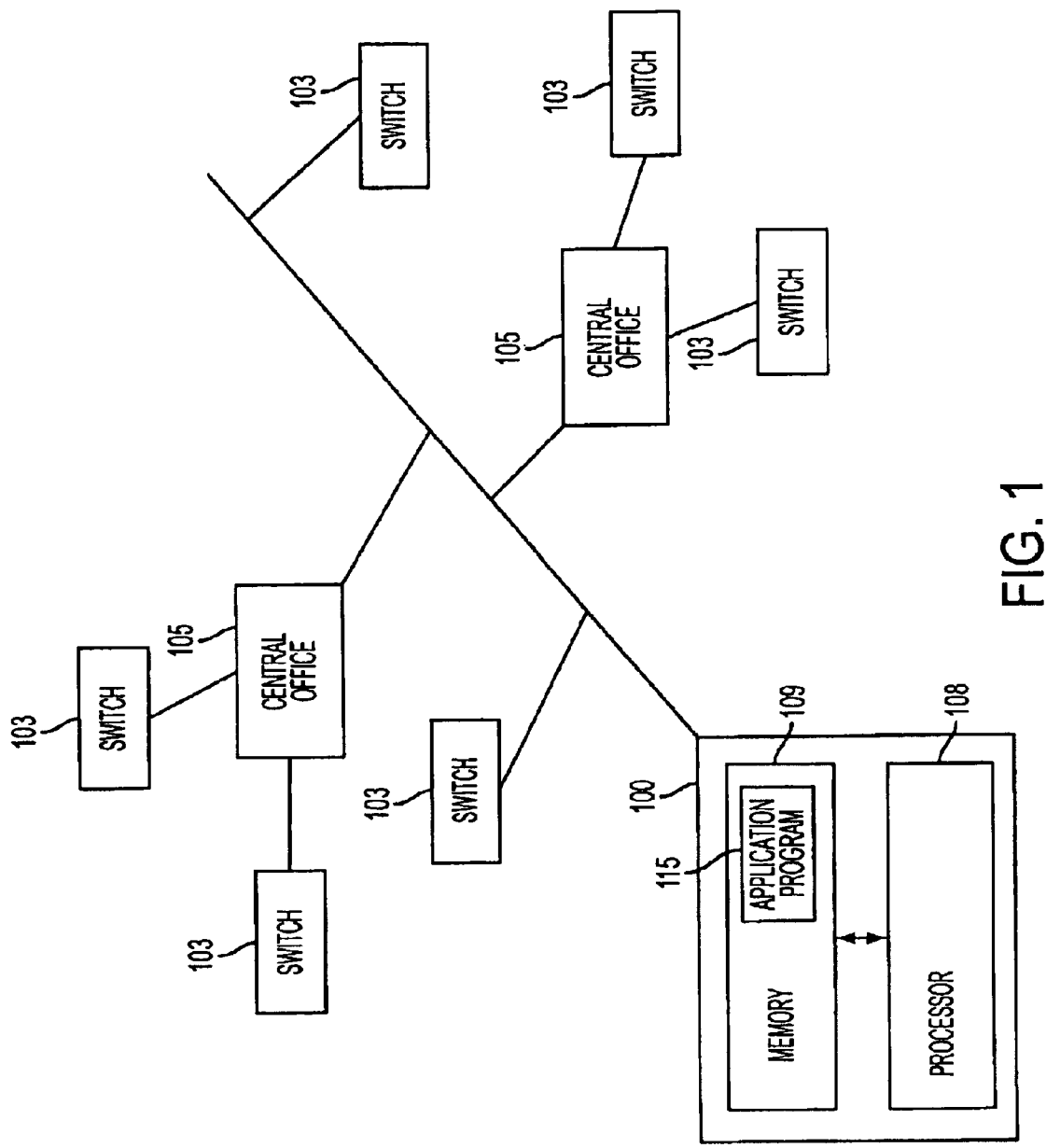

AUTOMATED ASSOCIATION OF OPERATIONS WITH OBJECTS IN A GRAPHICAL WINDOW

BACKGROUND OF THE INVENTION

A. Field of the Invention

The present invention relates generally to computer software development, and more specifically, to the automatic generation of user menus in a graphical user interface.

B. Description of Related Art

Graphical user interfaces (GUIs) present a graphical (rather than textual) interface through which a user may interact with a computer. In a GUI application, commands that can be invoked by the end user are typically represented as some sort of graphical button on a menu, such as selectable fields in a popup menu, a menubar with pulldown and pullright menus, or as icons on a toolbar.

Applications in a GUI environment often present multiple different visual windows to the user, each of which may include a different set of menu buttons. For example, in an application that monitors and controls a network, a first window may present a graphical illustration of elements in the network, while a second window may give a tabular representation of trouble spots within the network. Conventionally, a programmer designing the first and second windows would individually write the computer code to implement the different set of buttons in the menus in the first and second windows.

Although individually writing the computer code for the buttons in the first and second windows is a straightforward and flexible approach, it is not without its disadvantages. In particular, a first potential problem is that although certain buttons can apply in more than one window, programmers may forget to code all of the applicable buttons for the menus in each window. This can be problematic, because users expect identical objects, such as, for example, a network switch illustrated in two different windows, to support the same operations. A common occurrence of this problem happens when a programmer adds a new menu button to one window but forgets to add the new menu button to other related windows.

A second potential problem associated with conventional techniques is that the computer code that implements the substantive aspect of an element can become intertwined with more generic aspects relating to the particular GUI. In this situation, converting the application to work with another GUI can be time consuming.

Accordingly, there is a need in the art to allow programmers to more easily implement buttons in applications in a GUI environment.

SUMMARY OF THE INVENTION

Systems and methods consistent with the present invention address these and other needs by providing for the automatic inclusion of operations, such as the automatic generation of menu buttons, in a window.

A first aspect of the present invention is directed to a method of automatically assigning operations to objects in a graphical window of an application program. The method includes receiving a list of operations and a list of resources required by each of the operations; and receiving a list of resources offered by the window. Based on the received lists, an operation is assigned from the list of operations to the objects in the window when the resources required by the operation are offered by the window.

A second aspect of the present invention is directed to a computing device comprising a plurality of elements. The elements include a program containing at least one graphical window, the graphical window containing graphical objects; and an operations repository containing operations that apply to selected ones of the graphical objects. Additionally, an operations manager component logically couples the windows in the program to the operations repository, compares resources required by the operations in the operations repository to resources offered by the graphical window, and assigns the operations in the operations repository to the graphical windows when the resources required by the operations are offered by the window.

Another aspect of the present invention is directed to a network including a plurality of network objects used to control traffic on the network. The network further includes a computer system, coupled to the plurality of network objects via the network, the computer system including a computer processor and a memory, the memory storing an application program used to monitor the network objects. The application program includes: at least one graphical window displaying graphical representations of the network objects; an operations repository containing operations that apply to selected ones of the network objects; and an operations manager component that logically couples the window to the operations repository. The operations manager component also compares resources required by the operations in the operations repository to resources offered by the graphical window and assigns the operations in the operations repository to the graphical window when the resources required by the operations are offered by the window.

BRIEF DESCRIPTION OF THE DRAWINGS

The accompanying drawings, which are incorporated in and constitute a part of this specification, illustrate the invention and, together with the description, explain the invention. In the drawings, FIG. 1 is a diagram of an exemplary computer network on which concepts consistent with the present invention may be implemented;

DETAILED DESCRIPTION

Figure 2A:
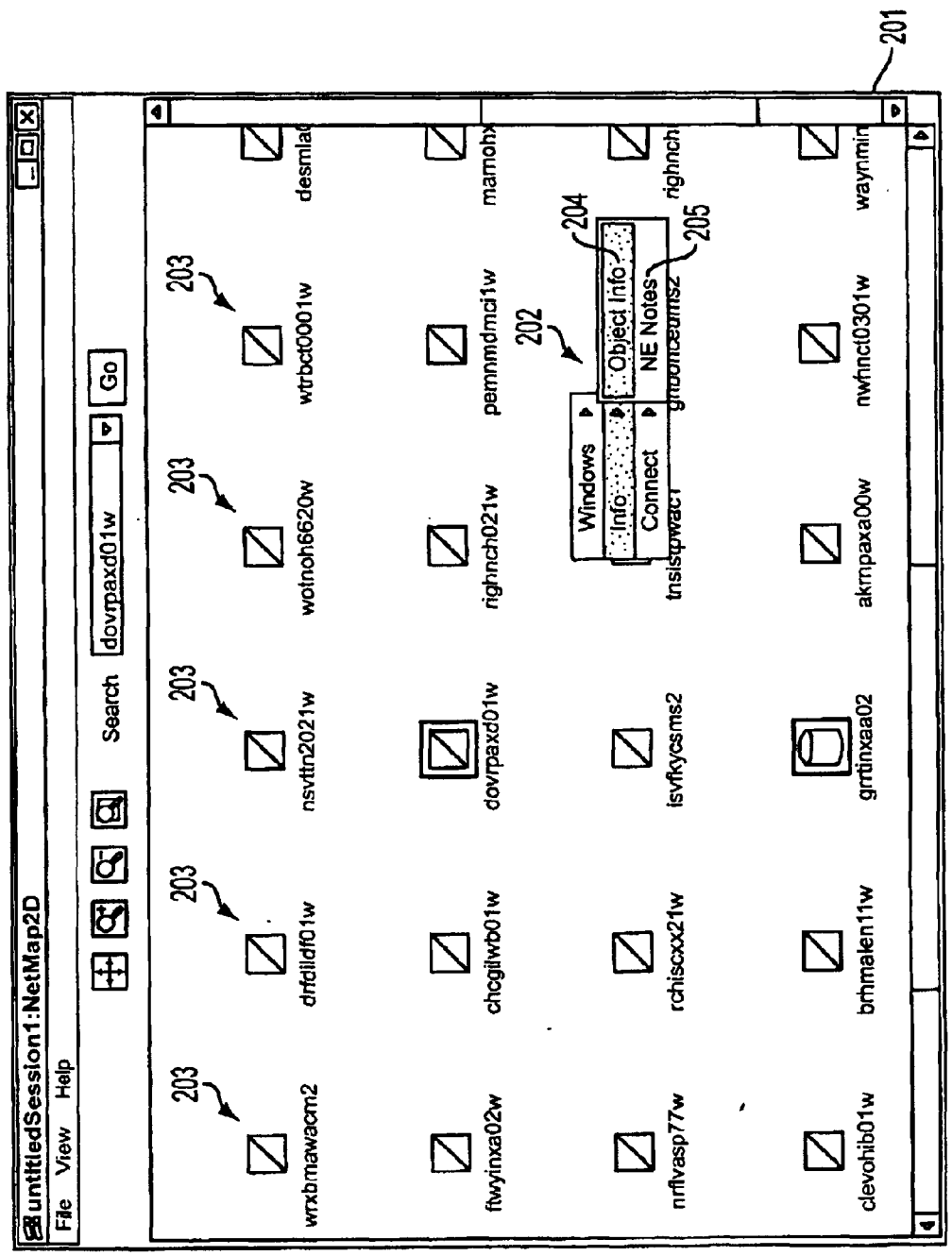
FIGS. 2A–2C are diagrams illustrating exemplary windows in an application program.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

As is generally described herein, operations relating to objects in a window are automatically included in the window based on the capabilities of the window and based on the resources required to implement the operations. The operations may be made available to the end-user by automatically adding buttons to menus in the window that invoke the operations.

FIG. 1 is a diagram of an exemplary computer network on which concepts consistent with the present invention may be implemented. The computer network includes a computing device 100 that has a computer-readable medium 109, such as random access memory, coupled to a processor 108. Processor 108 executes program instructions stored in memory 109. Computing device 100 may also include a number of additional external or internal devices, such as, without limitation, a mouse, a CD-ROM, a keyboard, and a display.

As illustrated, computing device 100 is coupled to a telecommunications network that includes a number of network objects, such as telecommunication switches 103 and central offices 105.

Processor 108 can be any of a number of well known computer processors, such as processors from Intel Corporation, of Santa Clara, Calif. In general, computing device 100 may be any type of computing platform connected to a network and that interacts with application programs, such as a digital assistant or a "smart" cellular telephone or pager. Computing device 100 and its surrounding telecommunication system is exemplary only; concepts consistent with the present invention can be implemented on any computing device, whether or not connected to a network. In particular, although illustrated in the context of a telecommunications network, the concepts described herein may be implemented independently of the telecommunications network.

Memory 109 contains an application program 115 that executes in a GUI environment. The application program 115 may include multiple windows, each of which may display various graphical objects and buttons that invoke functions associated with those objects. The term "buttons," as used herein, refers broadly to any type of graphical interface through which a user can select actions, such as selectable fields in a popup menu, a menubar with pulldown and pullright menus, or as icons on a toolbar. Buttons are typically grouped within graphical menus or toolbars.

Figure 2B:
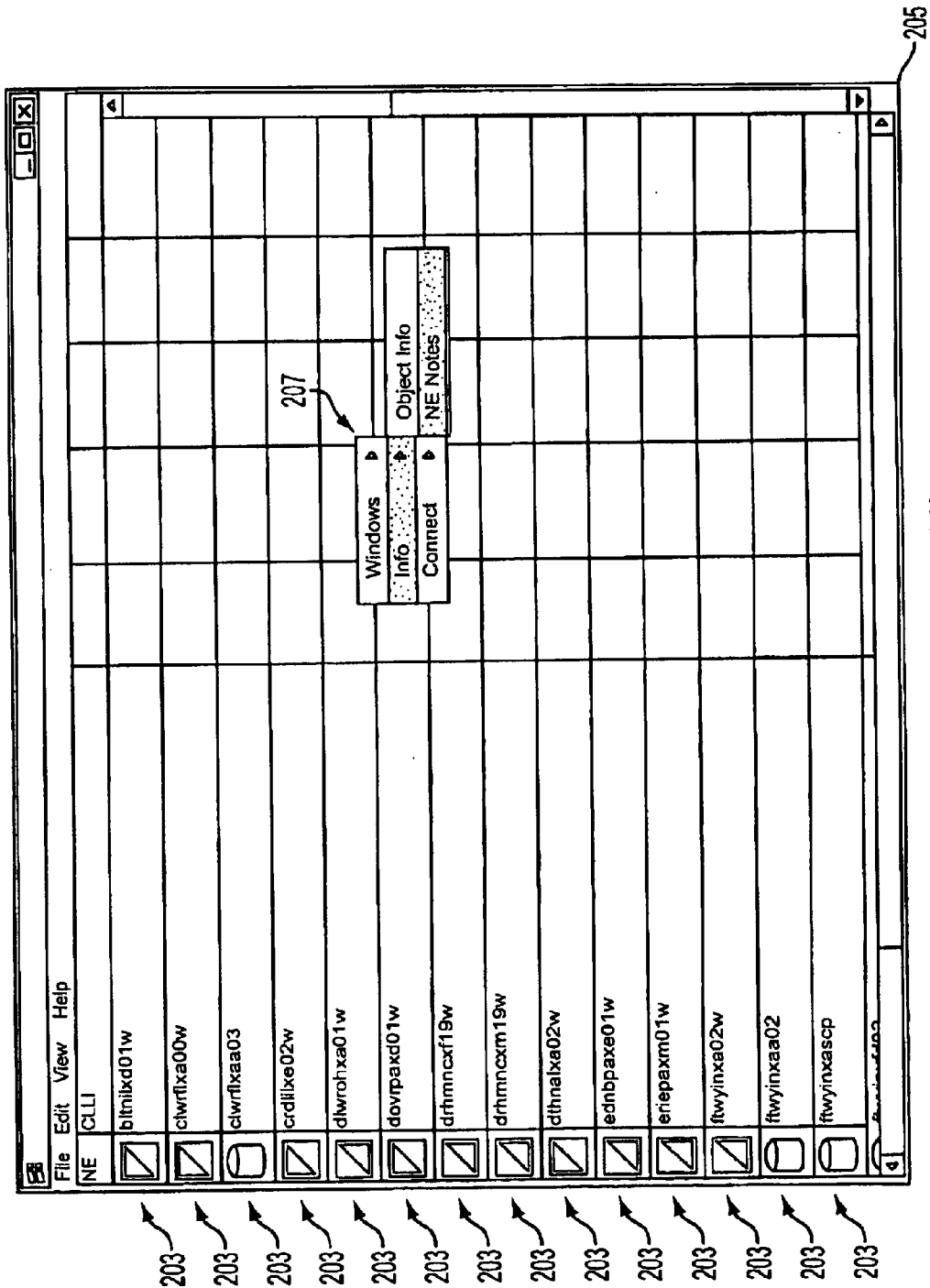
Figure 2C:
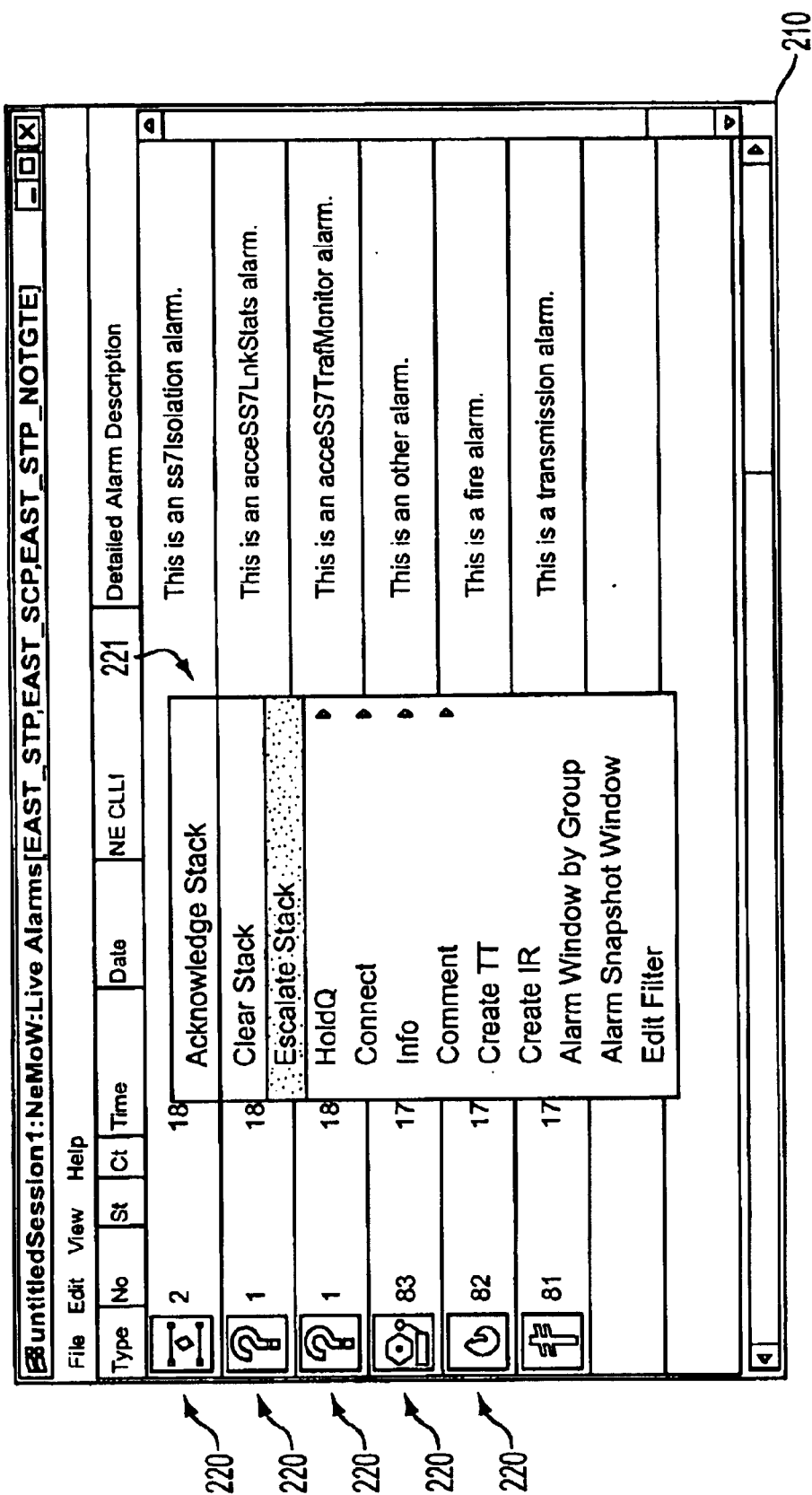

FIGS. 2A through 2C are exemplary diagrams of possible windows in application program 115. Window 201, shown in FIG. 2A, displays a number of network elements 203 to the user. Network elements 203 may, for example, represent switches 103 in a telecommunications network. Application program 115 may visually inform the user of the status of a particular network element by altering the color of the network element so that network elements experiencing problems are highlighted. In response to right-clicking on a particular network element, application program 115 may display a pop-up menu 202 containing a plurality of buttons 204 and 205 that define user selectable operations relating to the chosen network element. The illustrated operations include connecting to the network element (button 204) or displaying information about the network element (button 205).

FIGS. 2B and 2C are diagrams illustrating additional exemplary windows of application program 115. Window 205, shown in FIG. 2B, is a "tabular information window" that displays an alternate representation of network elements 203 (i.e., as a row in a table of network elements 203). Each row of the table includes additional information about that current status of its network element. Menu 207 is activated in response to the user right-clicking in a table row. Because the underlying network elements 203 illustrated in widows 201 and 205 are identical, the buttons displayed on menu 207 are identical to those displayed on menu 202.

Window 210, shown in FIG. 2C, does not display network elements 203. Instead, window 210 displays network "alarm objects" 220 in tabular form to the user. Menu 221, which is activated by the user right-clicking on the appropriate row in window 210, illustrates operations that apply to the selected alarm object 220.

Figure 3:
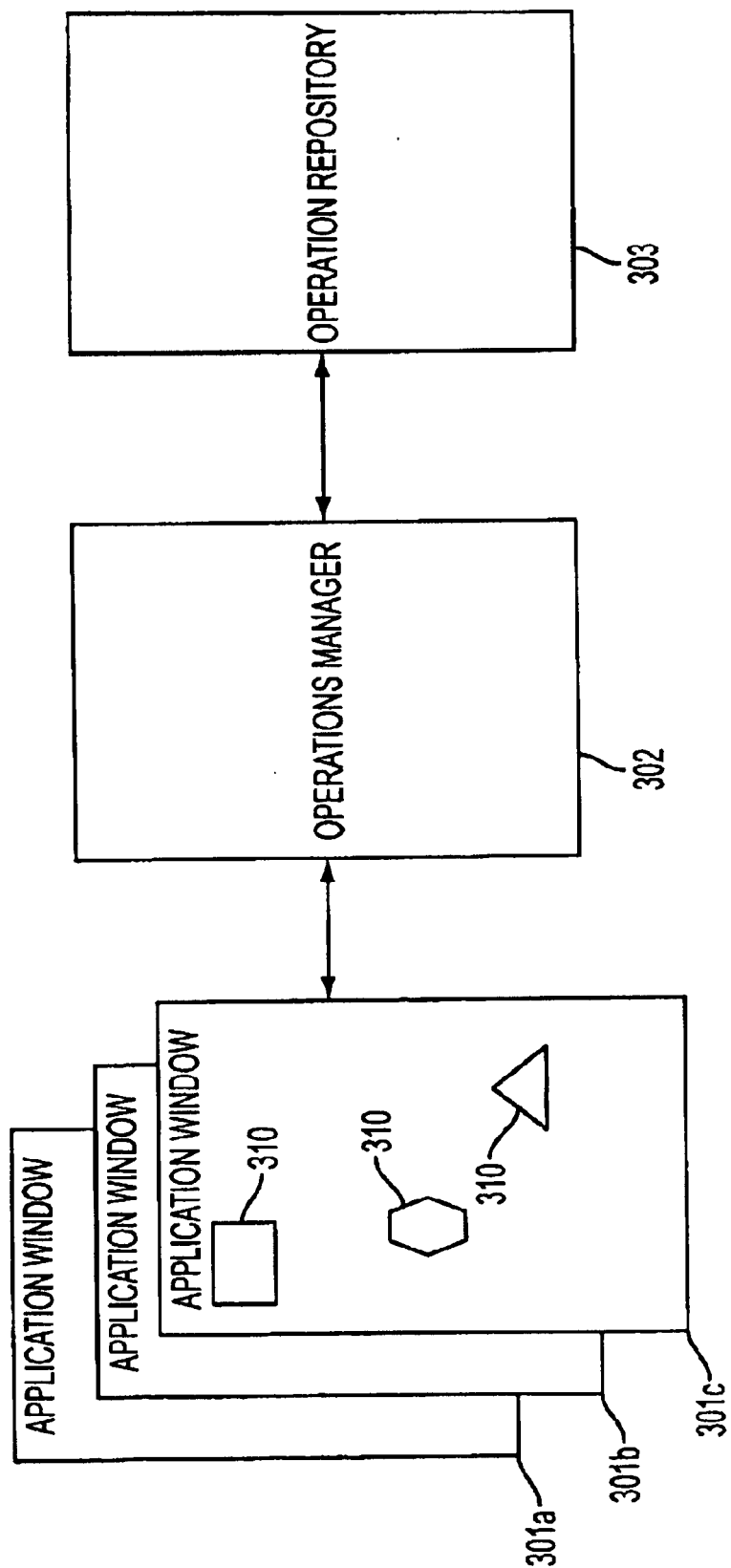
FIG. 3 is a block diagram illustrating the functional interaction of software components for automatically assigning operations to objects in a window.

FIG. 3 is a block diagram illustrating, at a high level, the functional interaction of various software components in application program 115 for automatically assigning operations to objects in a window. Three separate software components are shown in FIG. 3: windows 301a through 301c (which may contain objects 310), operations manager component 302, and operation repository 303. Windows 301a–301c each define a window, such as window 201, in application program 115. Window components 301a–301c may be implemented so that, when queried by operations manager component 302, the queried window component returns a list of services it offers. The services offered by a window may be defined by the programmer at design time, and can include services such as, returning the set of all of its network elements selected by a user and returning the set of all of the alarm objects that the window contains.

Operation repository 303 stores operations that may be implemented on objects 310. Operation repository 303, when queried by operations manager component 302, returns a list of operations it contains and the services required by each of the operations. For example, the operation "connect to network element," which requires the service "return network elements," may be implemented by operation repository 303.

Operations manager 302 determines which operations, of the operations in operation repository 303, should be supported by each of windows 301a through 301c. More specifically, operations manager component 302 compares the services required by each operation in operation repository 303 to the list of services offered by each of windows 301a through 301c. When all of the services required by a particular operation are available from the window, operations manager component 302 makes the operation available to the user of the application.

A more detailed description of concepts consistent with the present invention will now be described with reference to FIGS. 4 and 5. Although the description below is described in the context of an object oriented programming language, such as C++ or the Java programming language, one of ordinary skill in the art will recognize that other programming languages could equivalently be used.

Figure 4:
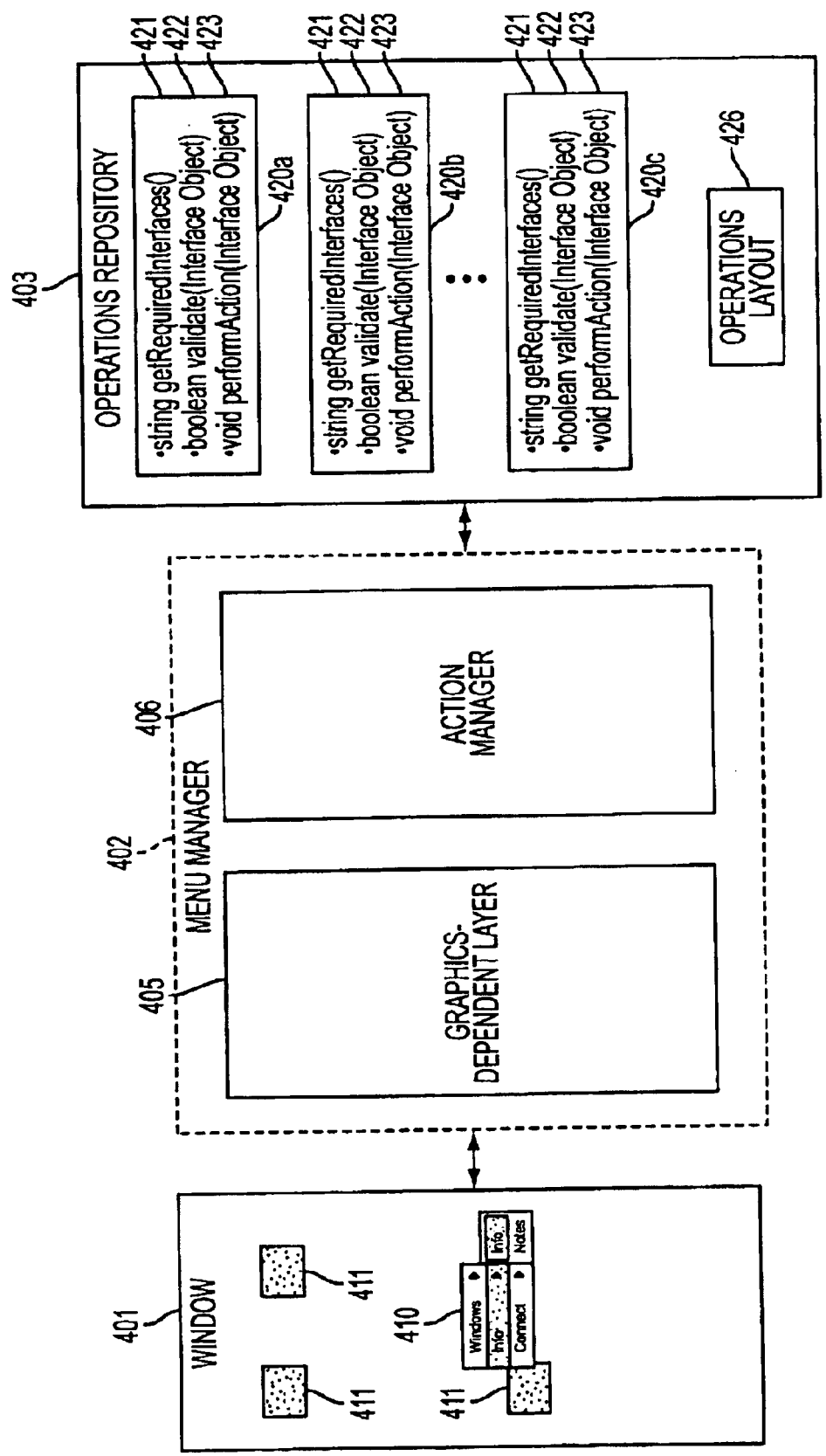
FIG. 4 is a block diagram illustrating the detailed functional interaction of software components consistent with the present invention.
Figure 5:
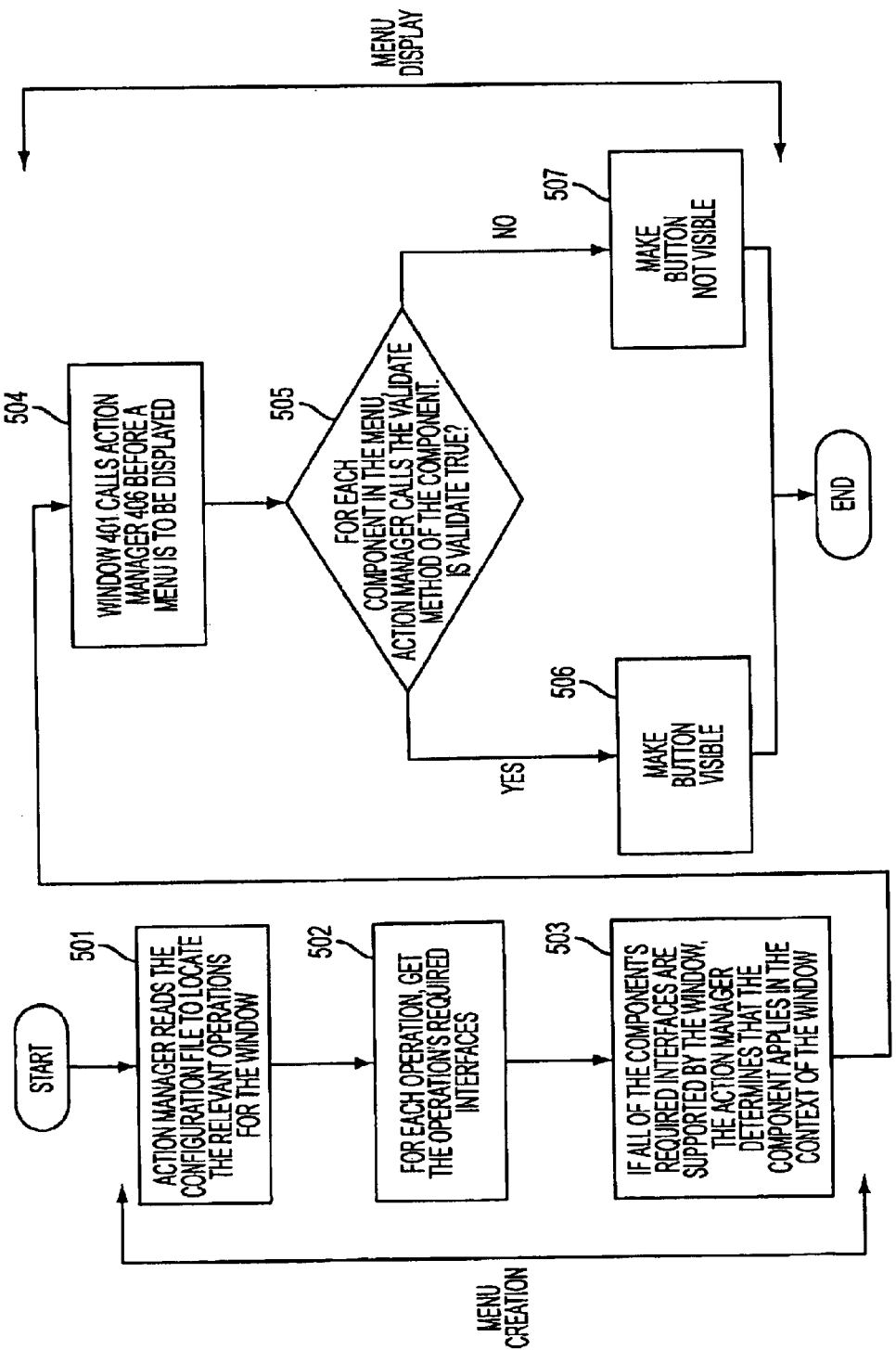
FIG. 5 is a flow chart illustrating operation of the menu manager component described herein.

FIG. 4 is a block diagram illustrating, in more detail, the functional relationships between software components consistent with the present invention.

Window 401 is a window in application program 115. Window 401, when displaying a menu relating to an object, such as menu 410, which relates to object 411, calls an instance of menu manager component 402. Menu manager component 402 creates and updates menus appropriate to window 401. Menu manager component 402 includes a graphics-dependent layer 405 and action manager component layer 406. Action manager component 406 handles the substantive aspects of determining what buttons to place in a particular menu, such as the "Info" and "Notes" button on menu 410, while the graphics-dependent layer 405 draws the actual window. Because graphics-dependent layer 405 is an independent layer from action manager 406, the graphics-dependent layer may be modified to handle display operations for different graphical packages without requiring substantial modifications to action manager 406.

Operations repository 403 includes the computer instructions that actually implement the operations of the objects in window 401. In other words, operations repository 403 encapsulates the implementation of the object's operations. Potential operations are illustrated as operations 420a through 420c. Operations 420a through 420c may be defined by the developer of the application program 115 or by end users that wish to customize the application program.

Each operation 420a through 420c may be implemented as a separate file, such as a "class" file in the Java programming language. Action manager 406 determines which operation 420a through 420c to provide to a user for a particular application program 115 based on one or more configuration files 426 (labeled as "Operations Layout"). Configuration file 426 is preferably a text file that lists the supported operations 420a through 420c, as well as properties of the operations 420a through 420c. Because configuration file 426 is a text file and operation components 420a through 420c are separate class files, developers and end users wishing to add additional object operations can easily view and modify the configuration file 426 to add such operations.

When implementing a new operation, the user or developer begins by implementing a common interface through which action manger component 406 can access the operations. This common interface includes three basic methods that define the interface between a particular operation and action manager 406. As shown in FIG. 4, the three methods include the "getRequiredInterfaces" method 421, the "validate" method 422, and the "performAction" method 423. Method 421, when called by action manager component 406, returns an array of strings that define the services required by the component. In the Java programming language, the services may be defined by an array of strings that lists programming interfaces that the operation component requires.

PerformAction method 423, when called by action manager 406, implements the operation defined by the component. For example, an operation applicable to a network switch may be to connect to the switch.

The validate method 422 is an optional method. The validate method 422 is called by action manager 406 and indicates whether a button associated with the operation should be made active. If validate is not implemented, the result of validate is assumed to be true (i.e., the button is made active).

The operation of menu manager 402 in conjunction with window 401 and operations repository 403 will now be described in detail with reference to the flow chart of FIG. 5.

When a menu is initially created by window 401, action manager component 406 begins by reading configuration file 426 to locate the relevant operations 420a through 420c. (Act 501). Subsequent calls to build or update a menu, such as menu 410, are made by window 401 to menu manager 402. Associated with each menu is an object that defines the interfaces available to action-manager 406 from the window 401. For each operation 420a through 420c listed in the configuration file 426, action manager 406 calls the getRequiredInterfaces method 421 of the operation 420a through 420c, (Act 502), which returns an array of strings that define the interfaces implemented by the operation. If all of the interfaces returned by getRequiredInterfaces method 421 are implemented by window 401, action manager 406 determines that the associated operation applies in the context of the window. (Act 503).

Merely because an operation applies in the context of a window does not necessarily mean that a button corresponding to the operation will always appear in the menu. Instead, window 401, during run-time operation, calls action manager 406 just before the menu is to be displayed (e.g., just after the user right-clicks the mouse to activate the window). (Act 504). In response, action manager 406 calls the validate methods 422 of each operation 420a through 420c. (Act 505). If the validate method 422 returns true, the button is made available (e.g., made visible) within the menu. (Act 506). If false, the button is made unavailable (e.g., made not visible). (Act 507). An available button refers to one that can be selected by the user. An unavailable button is not selectable by the user. One of ordinary skill in the art will recognize that a button may be made unavailable to the user by either making in unresponsive to mouse clicks and dimming or altering its appearance so that the user knows that the button is not currently selectable, or by making the button disappear entirely (i.e., making the button invisible) and packing the surrounding buttons together so that the menu does not allocate any space to the invisible button. The validate method 422 is defined individually by each operation component 420a through 420c. In general, for those operations that can apply in the context of a given interface, it is the job of the validate method to determine whether they actually do apply at that point in time. The validate method for a particular operation, for example, may return true if a predetermined number of network elements are selected in window 401 and false otherwise.

As described above, a programmatical structure provides for the automatic inclusion of operations, such as the automatic generation of menu buttons, in a window of an application program. The sharing of the application program's windows is maximized, thus presenting the end user with a coherent set of windows that are uniform in appearance and consistent in behavior. Additionally, the operations are extensible, which allows additional operations to be easily added by either the original developer or by end users.

It will be apparent to one of ordinary skill in the art that the embodiments as described above may be implemented in many different embodiments of software, firmware, and hardware in the entities illustrated in the figures. The actual software code or specialized control hardware used to implement the present invention is not limiting of the present invention. Thus, the operation and behavior of the embodiments were described without specific reference to the specific software code or specialized hardware components, it being understood that a person of ordinary skill in the art would be able to design software and control hardware to implement the embodiments based on the description herein.

The foregoing description of preferred embodiments of the present invention provides illustration and description, but is not intended to be exhaustive or to limit the invention to the precise form disclosed. Modifications and variations are possible consistent with the above teachings or may be acquired from practice of the invention. The scope of the invention is defined by the claims and their equivalents.

What is claimed:

1. A method of automatically assigning operations to objects in a graphical window of an application program, comprising:

receiving a list of operations and a list of resources required by each of the operations;

receiving a list of resources offered by the graphical window; and assigning an operation from the list of operations to the objects in the graphical window when the resources required by the respective operation are offered by the graphical window.

2. The method of claim 1, wherein the assigned operation is displayed as a graphical button in a menu in the graphical window.

3. The method of claim 2, further including:
displaying the graphical button in the menu using a graphics-dependent software layer.

4. The method of claim 2, further comprising:
calling validate methods in response to receiving a request to display the menu and prior to making the menu visible, the validate methods determining whether the graphical buttons in the menu are made available or unavailable.

5. The method of claim 1, wherein the objects are devices in a telecommunications network.

6. The method of claim 1, wherein each of the operations is stored as an individual file in a computer system.

7. The method of claim 1, wherein the list of resources required by each of the operations is received in response to querying a method of each of the respective operations designed to return the list of required resources.

8. The method of claim 1, wherein the list of resources offered by the graphical window is received in response to a query of the graphical window.

9. A computing device comprising:
a program containing at least one graphical window, the graphical window containing graphical objects;
an operations repository containing operations that apply to selected ones of the graphical objects; and
an operations manager component that logically couples the at least one graphical window in the program to the operations repository, the operations manager component comparing resources required by the operations in the operations repository to resources offered by the at least one graphical window and assigning the operations in the operations repository to the at least one graphical window when the resources required by the operations are offered by the at least one graphical window.

10. The computing device of claim 9, wherein the operations manager component includes:
an action manager component that compares the resources required by the operations in the operations repository to the resources offered by the at least one graphical window; and
a graphics-dependent layer configured to display the assigned operations as graphical buttons in a menu in the at least one graphical window.

11. The computing device of claim 10, wherein the menu is a pop-up menu that is displayed in response to a user selecting at least one of the graphical objects.

12. The computing device of claim 11, wherein the operations repository includes:
a plurality of files, each defining one of the operations in the operation repository; and
an operations layout file configured to identify the plurality of files.

13. The computing device of claim 12, wherein the operations layout file is a text file.

14. The computer device of claim 9, wherein the computing device is coupled to a telecommunications network and the graphical objects represent elements of the telecommunications network.

15. The computing device of claim 9, wherein the resources required by the operations are received in response to querying a method of each of the respective operations designed to return the resource required by the operation.

16. A network comprising:
a plurality of network objects used to control telecommunications traffic on the network; and
a computer system coupled to the plurality of network objects via the network, the computer system including a computer processor and a memory, the memory storing an application program used to monitor the network objects, the application program including:
at least one graphical window displaying graphical representations of the network objects,
an operations repository containing operations that apply to selected ones of the network objects, and
an operations manager component that logically couples the graphical window to the operations repository, the operations manager component comparing resources required by the operations in the operations repository to resources offered by the graphical window and assigning the operations in the operations repository to the graphical window when the resources required by the operations are offered by the graphical window.

17. The network of claim 16, wherein the network objects are switches in a telecommunications network.

18. The network of claim 16, wherein the application program further includes:
an action manager component that compares the resources required by the operations in the operations repository to the resources offered by the graphical window; and
a graphics-dependent layer configured to display the assigned operations as graphical buttons in a menu in the graphical window.

19. The network of claim 18, wherein the menu is a pop-up menu that is displayed in response to a user selecting at least one of the graphical objects.

20. The network of claim 19, wherein the operations repository includes:
a plurality of files, each defining one of the operations in the operation repository; and
an operations layout file configured to identify the plurality of files.

21. The network of claim 20, wherein the operations layout file is a text file.

22. The network of claim 16, wherein the resources required by the operations are received in response to querying a method of each of the respective operations designed to return the resource required by the operation.

23. A computer readable medium storing instructions for causing at least one processor to perform a method that automatically assigns operations to objects in a graphical window of an application program, the method comprising:
generating a list of operations and a list of resources required by each of the operations;
generating a list of resources offered by the graphical window; and
assigning an operation from the list of operations to the objects in the graphical window when the resources required by the respective operation are offered by the graphical window.

24. The computer readable medium of claim 23, wherein the assigned operation is displayed as a graphical button in a menu in the graphical window.

25. The computer readable medium of claim 24, further including:
displaying the graphical button in the menu using a graphics-dependent software layer.

26. The computer readable medium of claim 24, further comprising:
   calling validate methods in response to receiving a request to display the menu and prior to making the menu visible, the validate methods determining whether the graphical buttons in the menu are made available or unavailable.

27. The computer readable medium of claim 23, wherein the objects are devices in a telecommunications network.

28. The computer readable medium of claim 23, wherein each of the operations is stored as an individual file in a computer system.

29. The computer readable medium of claim 23, wherein the list of resources required by each of the operations is received in response to querying a method of each of the respective operations designed to return the list of resources.

30. The computer readable medium of claim 23, wherein the list of resources offered by the graphical window is received in response to a query of the graphical window.

31. A system for automatically assigning operations to objects in a graphical window of an application program, comprising:
   means for receiving a list of operations and a list of resources required by each of the operations;
   means for receiving a list of resources offered by the graphical window; and
   means for assigning an operation from the list of operations to the objects in the graphical window when the resources required by the respective operation are offered by the graphical window.

32. The system of claim 31, wherein the assigned operation is displayed as a graphical button in a menu in the graphical window.

33. The system of claim 32, further including:
   means for displaying the graphical button in the menu using a graphics-dependent software layer.

34. The system of claim 31, wherein the objects are devices in a telecommunications network.

35. The system of claim 31, wherein each of the operations is stored as an individual file in a computer system.

36. The system of claim 31, wherein the list of resources required by each of the operations is received in response to querying a method of each of the respective operations designed to return the list of required resources.

* * * * *